United States Patent
Freess (10) Patent No.: US 9,925,985 B2
(45) Date of Patent: Mar. 27, 2018

(54) METHOD AND DEVICE FOR ASSISTING A DRIVER OF A VEHICLE WHEN DRIVING ON UNEVEN TERRAIN

(71) Applicant: Robert Bosch GmbH, Stuttgart (DE)

(72) Inventor: Jascha Freess, Leonberg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 14/760,438

(22) PCT Filed: Jan. 14, 2014

(86) PCT No.: PCT/EP2014/050586
§ 371 (c)(1),
(2) Date: Jul. 10, 2015

(87) PCT Pub. No.: WO2014/108556
PCT Pub. Date: Jul. 17, 2014

(65) Prior Publication Data
US 2015/0353095 A1  Dec. 10, 2015

(30) Foreign Application Priority Data

Jan. 14, 2013  (DE) .................. 10 2013 200 385

(51) Int. Cl.
*B60W 40/06* (2012.01)
*B60C 9/00* (2006.01)
(Continued)

(52) U.S. Cl.
CPC .............. *B60W 40/06* (2013.01); *B60C 9/00* (2013.01); *B60T 7/22* (2013.01); *B60W 10/18* (2013.01);
(Continued)

(58) Field of Classification Search
CPC .................. B60G 17/015; B60G 17/0165; B60G 17/016; B60G 23/00; B60G 17/0195; B60G 17/0164; B60G 17/02; B60W 30/02; B60W 40/10; B60W 10/06; B60W 10/22; B60W 50/14; B60W 30/095; B60W 30/192; B60W 30/20; B60W 10/11; B60W 30/188; B60W 40/60; B60T 7/122; B60T 8/172;
(Continued)

(56) References Cited

U.S. PATENT DOCUMENTS

2003/0088355 A1*  5/2003  Fuhrer .................. B60K 31/047
                                                    701/93
2005/0015201 A1    1/2005  Fields et al.
(Continued)

FOREIGN PATENT DOCUMENTS

DE  10 2008 001838   11/2009
DE  10 2009 047264    6/2011
(Continued)

*Primary Examiner* — Behrang Badii
(74) *Attorney, Agent, or Firm* — Norton Rose Fulbright US LLP; Gerard Messina (57) ABSTRACT

A method for assisting a driver of a vehicle when driving on uneven terrain includes classifying a terrain unevenness situated ahead of the vehicle in the driving direction, and ascertaining a piece of information for driving the vehicle in relation to the terrain unevenness based on a result of the classification.

12 Claims, 6 Drawing Sheets

(51) Int. Cl.

| | | |
|---|---|---|
| *B60T 7/22* | (2006.01) | |
| *B62D 15/02* | (2006.01) | |
| *B60W 50/14* | (2012.01) | |
| *B60W 10/18* | (2012.01) | |
| *B60W 10/20* | (2006.01) | |
| *B60W 10/22* | (2006.01) | |
| *B60W 30/18* | (2012.01) | |
| *B60W 30/095* | (2012.01) | |
| *G06F 7/00* | (2006.01) | |
| *B60W 50/00* | (2006.01) | |
| *B60W 30/02* | (2012.01) | |

(52) U.S. Cl.
CPC ............ *B60W 10/20* (2013.01); *B60W 10/22* (2013.01); *B60W 30/18009* (2013.01); *B60W 50/14* (2013.01); *B62D 15/0265* (2013.01); *B60W 30/02* (2013.01); *B60W 30/095* (2013.01); *B60W 50/0097* (2013.01); *B60W 2050/143* (2013.01); *B60W 2050/146* (2013.01); *B60W 2420/42* (2013.01); *B60W 2550/10* (2013.01); *B60W 2550/14* (2013.01); *B60W 2550/143* (2013.01); *G06F 7/00* (2013.01)

(58) Field of Classification Search
CPC .. B60T 7/12; B60D 1/065; B60D 1/28; G06F 7/00; B60R 22/00; E05F 15/00; G08G 1/09
See application file for complete search history.

(56) References Cited

U.S. PATENT DOCUMENTS

| | | | |
|---|---|---|---|
| 2005/0125107 A1* | 6/2005 | Schmidt | B60T 7/122 701/1 |
| 2007/0149350 A1* | 6/2007 | Anderson | B60W 10/06 477/54 |
| 2007/0225882 A1* | 9/2007 | Yamaguchi | B60W 30/095 701/36 |
| 2007/0244619 A1* | 10/2007 | Peterson | F02D 9/02 701/70 |
| 2007/0276576 A1* | 11/2007 | Inoue | B60T 7/122 701/80 |
| 2008/0110249 A1* | 5/2008 | DeGeorge | G01C 7/04 73/146 |
| 2011/0060478 A1 | 3/2011 | Nickolaou | |
| 2012/0143399 A1* | 6/2012 | Noumura | B60W 30/02 701/1 |
| 2014/0195112 A1* | 7/2014 | Lu | B60G 17/015 701/37 |
| 2014/0195116 A1* | 7/2014 | Hrovat | B60W 10/06 701/38 |

FOREIGN PATENT DOCUMENTS

| | | |
|---|---|---|
| DE | 10 2012 004198 | 10/2012 |
| DE | 10 2012 004201 | 10/2012 |

* cited by examiner

METHOD AND DEVICE FOR ASSISTING A DRIVER OF A VEHICLE WHEN DRIVING ON UNEVEN TERRAIN

FIELD OF THE INVENTION

The present invention relates to a method for assisting a driver of a vehicle when driving on uneven terrain, to a corresponding device, and to a corresponding computer program product.

BACKGROUND INFORMATION

Various comfort and safety functions, e.g., lane keeping systems, intelligent light control, traffic sign recognition, etc., are displayed today with the aid of mono or stereo front cameras (hereafter referred to MPC or SVC in short) integrated on the windshield. Such cameras detect, among other things, traffic lanes and objects which may be distinguished or classified in passenger cars, trucks, motorcycles, and the like.

SUMMARY OF THE INVENTION

Against this background, the present invention introduces a method for assisting a driver of a vehicle when driving on uneven terrain, furthermore a device which uses this method, and finally a corresponding computer program product as described herein. Advantageous embodiments are derived from the particular further descriptions herein and the following description.

One concept for assisting a driver of a vehicle when driving on unpaved roads and off-road includes a classification of problematic terrain features and a determination of pieces of information for the driver to handle the same.

For example, the driver may be given a timely warning of locations which could become critical in terms of damage to the vehicle or the vehicle becoming stuck. Depending on the variant of the approach described here, additionally a trajectory may be proposed to the driver to circumnavigate critical locations.

According to specific embodiments of a method described herein, the driver may advantageously receive assistance when driving on unpaved roads and off-road to avoid damage to the vehicle, or to avoid the vehicle from becoming stuck, as a result of improper measures by the driver.

For example, already present one or multiple forwardly directed sensors may be used for measuring the surface ahead of the vehicle and for anticipatorily ascertaining the resulting situation. The sensors may be assigned to a stereo camera of the vehicle, for example. Alternatively, it is also possible to use one or multiple LIDAR sensors.

According to specific embodiments of the method described here, the driver may be given a warning in particular of situations in which his or her vehicle could be damaged or become stuck. In one further variant, an optimized trajectory may be recommended to the driver, or the vehicle may also be guided on such a trajectory.

It is easily possible to configure algorithms required to carry out such a method.

A method for assisting a driver of a vehicle when driving on uneven terrain includes the following steps:
classifying a terrain unevenness situated ahead of the vehicle in the driving direction; and
ascertaining a piece of information for driving the vehicle in relation to the terrain unevenness based on a result of the classification.

The method may be carried out, for example, by a driver assistance system or in the context of a driver assistance system of the vehicle. The vehicle may be a truck or a passenger car, for example. The uneven terrain may be an unpaved road or also a pathless terrain off-road. The assistance of the driver may be aimed at contributing to moving the vehicle through the uneven terrain without damage and/or without becoming stuck. The step of classifying may be carried out with the aid of a suitable algorithm. For example, the terrain unevenness may be detected with the aid of one sensor or multiple sensors of the vehicle, and the algorithm for classification may be carried out using a piece of information about the detected terrain unevenness. The terrain unevenness may be a large- or small-scale change of the terrain compared to a presently driven area of the terrain, the change being relevant for the vehicle and/or occupants. The terrain unevenness may be classified as an uphill grade or a downhill grade having a wide variety of features, or also as an object impairing a trouble-free onward travel of the vehicle. The terrain unevenness may represent a single spatially narrowly limited terrain feature or a large-scale change of terrain having a plurality of terrain unevennesses. In principle, initially the terrain unevenness may generally be evaluated with respect to an inherent hazard potential for the vehicle and/or the occupants of the vehicle in the step of classifying. If, e.g., in one specific embodiment of the method, the step of classifying arrives at the general result that the terrain unevenness has no hazard potential, the method may be ended at this point. However, if the general result is the identification of a hazard potential, the method may continue to the step of ascertaining. The driving direction may represent a purposefully planned movement direction of the vehicle. The step of ascertaining may also be carried out using a suitable algorithm. In the step of ascertaining, in principle the result of the classification may lead to a determination of a strategy for circumnavigating the terrain unevenness situated ahead. The strategy may then, e.g., be output to the driver of the vehicle via an output unit of the vehicle with the aid of the piece of information for driving the vehicle. Having knowledge now of the terrain unevenness, the piece of information for driving the vehicle may be, e.g., a piece of warning information, a piece of steering information, or a piece of information about an ideal trajectory for negotiating, traversing or circumnavigating the terrain unevenness. The information for driving the vehicle may be transmitted to the driver of the vehicle visually, for example with the aid of an icon on a display unit of the vehicle, acoustically, e.g., via an alarm sound, or also haptically via the steering wheel of the vehicle.

According to one specific embodiment, the method may include a step of detecting the terrain unevenness with the aid of at least one optical sensor of the vehicle. The at least one optical sensor may be part of a mono or stereo front camera of the vehicle. In the step of classifying, the terrain unevenness may then be identified and classified with the aid of a depiction of the same ascertained by the front camera. In this specific embodiment, the method may in particular carry out the step of classifying with a very low error rate due to the optimal identification options for the terrain unevenness. This specific embodiment also allows a 3D depiction of a scene ahead of the vehicle, so that exact dimensions of the terrain unevenness are achievable. In addition or as an alternative, the vehicle may also be equipped with a mono or stereo rear camera, so that terrain unevennesses may also be classified, and accordingly be negotiated or circumnavigated, when the vehicle is backing up.

According to one further specific embodiment of the method, the terrain unevenness may be classified in the step of classifying as an obstacle which excludes damage-free onward travel of the vehicle. In corresponding fashion, the piece of information for driving may be ascertained in the step of ascertaining as a warning for the driver of the vehicle against onward travel. Such a classification may be understood to mean, e.g., terrain unevennesses such as an excessively steep ramp on which the vehicle would skid or, e.g., a rock formation which is not possible to circumnavigate for space reasons. With this specific embodiment, it is possible to save the driver of the vehicle from a potentially disastrous misjudgment of the situation and attendant damage to the vehicle or even endangerment of the physical integrity of occupants of the vehicle. The warning may be output to the driver, e.g., with the aid of an alarm sound and/or a corresponding icon, e.g., on a viewing direction display of the vehicle.

According to one specific embodiment, the terrain unevenness may be classified in the step of classifying as an obstacle which excludes damage-free onward travel of the vehicle. In the step of ascertaining, the piece of information for driving may be ascertained as a brake signal for initiating a brake application of the vehicle. For example, the brake signal may be suitable for initiating an emergency braking of the vehicle or reducing an instantaneous speed of the vehicle to a suitable speed for negotiating or circumnavigating the terrain unevenness.

In the step of classifying, for example, the terrain unevenness may be classified as a ramp and/or a transverse bump formed transversely to the driving direction. In the step of ascertaining, the piece of information for driving may be ascertained as a piece of information for carrying out a steering movement to initiate a negotiation of the ramp and/or the transverse bump in an onward driving direction which extends obliquely to the ramp and/or the transverse bump. The ramp may be an uphill grade or a downhill grade of the terrain situated ahead of the vehicle. The ramp may be drastically inclined or run relatively flat. It may be inclined evenly or in a stepped manner. The transverse bump may extend transversely or obliquely in relation to the driving direction. It may be distinct in such a way that, when the vehicle is driven forward, first the front tires and subsequently the rear tires of the vehicle must be driven across it. The transverse bump may be composed of solid terrain or be formed by a snow bank or a sand dune.

Negotiating the ramp or the transverse bump diagonally or obliquely may advantageously reduce a tilting tendency of the vehicle to a minimum. Moreover, a risk of the vehicle hitting the ground when driving onto or off the ramp may be effectively reduced. The direction and deflection of the steering movement may be communicated to the driver of the vehicle, e.g., by superimposing an arrow on a display unit of the vehicle.

Moreover, in the step of classifying, the terrain unevenness may be classified as a longitudinal bump formed along the driving direction. In corresponding fashion, the piece of information for driving may be ascertained in the step of ascertaining as a piece of information for carrying out a steering movement to initiate one-sided driving on the longitudinal bump with the wheels of the vehicle on the left or right sides. The longitudinal bump may be a ground elevation which extends in the driving direction and exists between two wheel ruts of a roadway and which may represent a risk for damage to an underbody of the vehicle. One-sided driving on the longitudinal bump with either the right or the left vehicle side may protect the underbody of the vehicle from damage in a simple manner. Once again, the piece of information may be conveyed by a superimposition of a corresponding icon.

As an alternative or in addition, the terrain unevenness may be classified in the step of classifying as a traffic lane deformation and/or a pothole, the piece of information for driving being ascertainable in the step of ascertaining as a piece of information for carrying out a steering movement for circumnavigating the traffic lane deformation and/or the pothole on an ideal trajectory. This specific embodiment may advantageously be used to exclude damage to the vehicle when driving through the pothole or the traffic lane deformation or, e.g., the risk of becoming stuck in the pothole. Once again, the piece of information may be superimposed as an icon on a display.

According to one specific embodiment, the method may include a step of reading in a piece of information about a trailer attached to the vehicle. In corresponding fashion, the step of ascertaining may furthermore be carried out based on the piece of information about the trailer. The trailer may be used to transport cargo. The trailer may also be a camper. The trailer may be joined to a rear of the vehicle with the aid of a hitch element. To prevent the trailer or the hitch element from hitting the ground or from being damaged, for example when entering or exiting ramps, the step of reading in a piece of information about the trailer may, e.g., include a substep of reading in a hitch type, a substep of detecting a deflection of the hitch, a substep of detecting or reading in an average distance of the hitch element from the ground and/or a substep for reading in a tilting stability of the trailer. This specific embodiment of the method allows the safety for the vehicle and occupants to be further improved.

In particular, the method may include a step of outputting the piece of information for driving the vehicle to a driver assistance system of the vehicle. The driver assistance system may be configured to effectuate an intervention in a steering system of the vehicle. For example, the driver assistance system may be coupled to a vehicle dynamics control system or a power steering system of the vehicle and be configured to provide the driver with steering hints, for example, or to influence the steering system or automatically carry out the steering. In corresponding fashion, the intervention in the steering system may be a steering movement of a steering wheel of the vehicle which is independent of the driver and prompted by the driver assistance system. In addition or as an alternative, the driver assistance system may be configured to effectuate an intervention in a braking system of the vehicle. For example, the driver assistance system may be configured to carry out an asymmetrical braking intervention to steer the vehicle in a direction which is adapted to the terrain unevenness. The driver assistance system may furthermore be configured to provide the driver of the vehicle with a hint about a driving style which is adapted to the terrain unevenness. For example, a hint may be visually displayed to the driver. For example, a display unit of a navigation system, an information system, or a combination unit may be used to display the hint. The hint may be displayed as a directional arrow or as a recommended change of speed, for example.

This specific embodiment of the method offers an even higher degree of safety since in this way it is possible to avert the risk of the driver carrying out too late, or not at all, a steering movement which is required to avoid damage or becoming stuck, and not being able to bring the vehicle on the ideal trajectory in a timely manner.

A device for assisting a driver of a vehicle when driving on uneven terrain includes the following features:

a unit for classifying a terrain unevenness situated ahead of the vehicle in the driving direction; and a unit for ascertaining a piece of information for driving the vehicle in relation to the terrain unevenness based on a result of the classification.

The device may be a control device of a driver assistance system. The device may also be used separately and be coupled to the driver assistance system and/or optionally to a camera system of the vehicle. The device may be configured to carry out or implement the steps of the method according to the present invention in the appropriate units. The object of the present invention may also be achieved quickly and efficiently by this embodiment variant of the present invention in the form of a device.

A device in the present invention may be understood to mean an electrical device which processes sensor signals and outputs control and/or data signals as a function thereof. The device may include an interface which may be configured as hardware and/or software. In the case of a hardware configuration, the interfaces may, for example, be part of a so-called system ASIC which includes a wide variety of functions of the device. However, it is also possible for the interfaces to be separate integrated circuits, or to be at least partially composed of discrete components. In the case of a software configuration, the interfaces may be software modules which are present on a microcontroller, for example, in addition to other software modules.

In addition, a computer program product is advantageous, having program code which may be stored on a machine-readable carrier such as a semiconductor memory, a hard disk memory or an optical memory, and which is used to carry out the method according to one of the specific embodiments described above, if the program product is executed on a computer or a device.

Driving on unpaved roads and off-road demands a high level of driving skills and great attention from the driver. Assistance systems may be used to assist him or her. Using such an assistance system, the driver may be relieved of the task of having to personally pay attention to selecting his or her path in such a way that the vehicle does not become stuck and is driven through the terrain without damage. Depending on the vehicle, electronic stability control (ESP) and ABS have additional software functions which identify off-road situations and may be used to be able to appropriately adapt the system performance.

With the aid of the disparity measurement, stereo front cameras are able to ascertain a 3D depiction of the situation ahead of the vehicle. Depending on the resolution of the cameras, so-called speed bumps and potholes and other unevennesses in the roadway surface are detectable and measurable, in addition to curbs.

A combination of a stereo front camera with the active chassis of a vehicle may be used to deliberately move the individual wheel suspensions with the aid of measurement results, so that the impact effect when traversing speed bumps, curbs or the like, e.g., may be deliberately damped in such a way that it is almost imperceptible to the occupant. Simpler and more cost-effective systems are also under development, in which the damping properties of adjustable shock absorbers are settable based on the measurement results.

The present invention is described in greater detail hereafter based on the accompanying drawings by way of example.

DETAILED DESCRIPTION

In the following description of exemplary embodiments of the present invention, identical or similar reference numerals are used for similarly acting elements shown in the different figures, and a repeated description of these elements is dispensed with.

Figure 1:
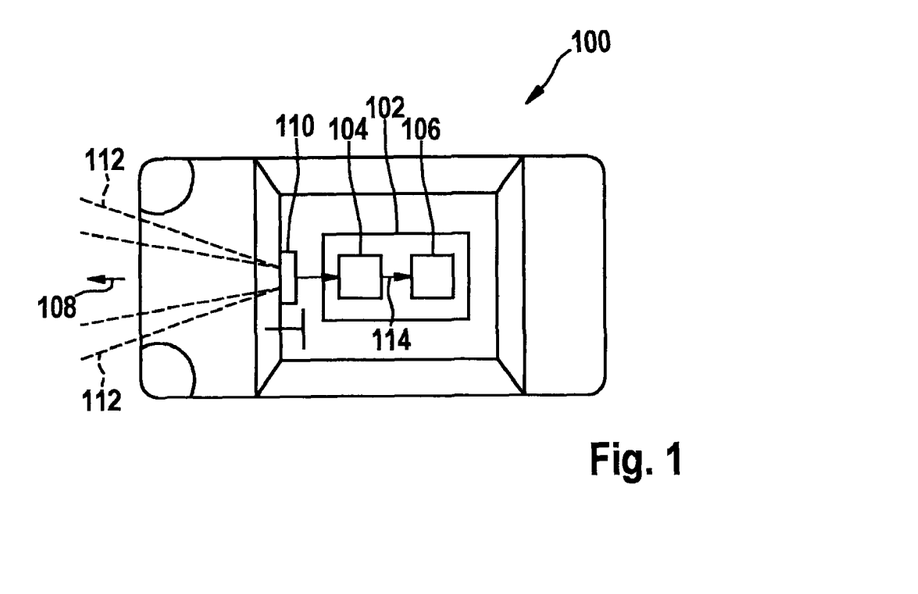
FIG. 1 shows a top view onto a vehicle including a device for assisting a driver of the vehicle when driving on uneven terrain according to one exemplary embodiment of the present invention.

FIG. 1 shows a top view onto a vehicle 100 including an exemplary embodiment of a device 102 for assisting a driver of vehicle 100 when driving on uneven terrain. Device 102 includes a unit 104 for classifying a terrain unevenness situated ahead of the vehicle in driving direction 108, and a unit 106 for ascertaining a piece of information for driving vehicle 100 in relation to the terrain unevenness. As the illustration in FIG. 1 shows, the vehicle is equipped with a stereo front camera 110 here. Stereo front camera 110 includes two optical sensors 112, which in the illustration are identified by detection cones. Optical sensors 112 are configured to detect a condition of the terrain situated ahead of vehicle 100 in driving direction 108, and in particular one or multiple terrain unevennesses, and to convey a corresponding piece of information via an interface to unit 104 for classifying. Based on a result 114 of unit 104 for classifying, unit 106 ascertains a piece of information for driving vehicle 100 in relation to the terrain unevenness. The piece of information for driving vehicle 100 may be output by device 102 to different components of vehicle 100. This is addressed in detail based on the following FIGS. 2A and 2B.

Sensors 112 integrated in vehicle 100 are able to measure a waviness, an inclination and a change of inclination of a surface ahead of vehicle 100 with an accuracy of <10 cm. In vehicle 100 shown here, they are situated for this purpose in such a way that they look at what may be a steep angle from above onto the surface to reduce shadowing effects. It is also possible to use only a single sensor 112. Optical sensors 112 are used in the exemplary embodiment shown in FIG. 1. Alternatively, it is also possible to use one or multiple radar or LIDAR sensors. Two sensors 112 may be integrated via an original component of vehicle 100 or a retrofit device.

Figure 2A:
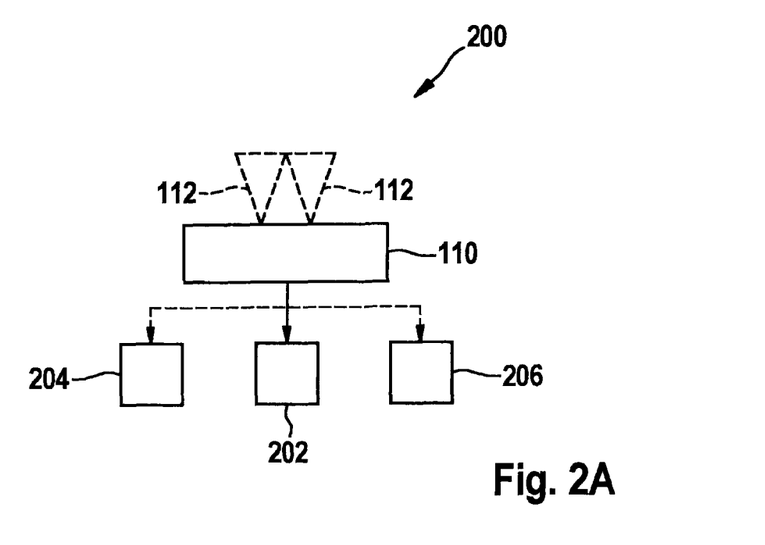
FIGS. 2A and 2B show block diagrams of driver assistance systems in conjunction with a method for assisting a driver of the vehicle when driving on uneven terrain, according to one exemplary embodiment of the present invention.
Figure 2B:
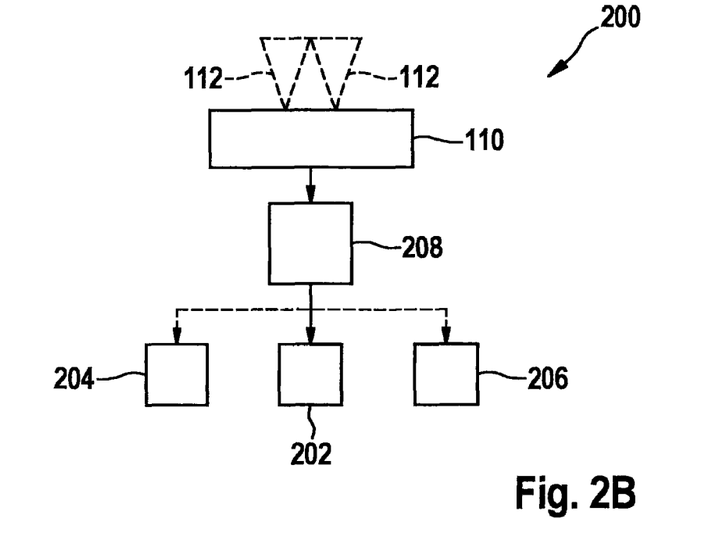

Based on block diagrams, FIGS. 2A through 2B show exemplary embodiments of driver assistance systems in conjunction with a method for assisting a driver of the vehicle when driving on uneven terrain.

FIG. 2A shows a block diagram of one exemplary embodiment of a driver assistance system 200. It shows stereo front camera 110 including two optical sensors 112. Moreover a user interface or a human-machine interface (HMI) 202, a vehicle dynamics control system 204, and an electromechanical power steering system 206 are shown. In the exemplary embodiment of driver assistance system 200 shown here, the device for assisting the driver is integrated into camera 110. For example, steering instructions are output to the driver of the vehicle via user interface 202 coupled to camera 110, e.g., via a superimposition on a head-up display or a field of vision display unit of the vehicle. Moreover, the vehicle dynamics control system or an electronic stability program (ESP) 204, and the electromechanical power steering system or an electronic power steering (EPS) system 206 are coupled to stereo front camera 110, so that these components of driver assistance system 200 may also be controlled as a function of the data detected by camera 110.

FIG. 2B shows a block diagram of one further exemplary embodiment of a driver assistance system 200. In the embodiment, this driver assistance system 200 corresponds to that of FIG. 2A, with the difference that here additionally a central control unit or an electronic control unit (ECU) 208 is integrated into the driver assistance system 200. Control unit 208 here includes the device for assisting the driver. Control unit 208 receives the image data from stereo front camera 110 and assumes the distribution of the appropriate pieces of information for driving the vehicle to HMI 202, vehicle dynamics control system 204, and power steering system 206. In addition to or instead of control unit 208, it is also possible to use a DAS unit.

As the illustrations in FIGS. 2A and 2B show, a driver assistance system 200 integrating the approach described here also uses component 202 for outputting warnings or recommendations, in addition to sensors 112. Depending on the variant, the steering system may additionally be influenced via EPS 206, or the braking system may additionally be influenced via ESP 204. The implementation of the method according to the present invention may be represented either on camera 110, on central driver assistance control unit 208, or completely decentrally on multiple or all of components 110, 202, 204, 206, 208.

The following FIGS. 3A through 6 show critical situations which may advantageously be solved by the use of the method described here or by the device described here. The situations shown in FIGS. 3A through 6 are shown in abstracted and modular fashion. In the majority of cases, real situations present themselves as combinations and modifications of the individual situations described hereafter.

Figure 3A:
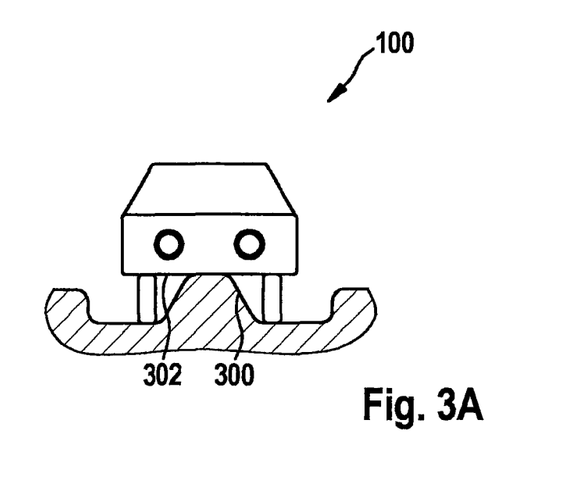
FIGS. 3A and 3B show schematic diagrams of a vehicle being driven along a longitudinal bump, according to exemplary embodiments of the present invention.

Based on a simplifying sketch, FIG. 3A shows a situation in which vehicle 100 drives along a bump in the longitudinal direction or longitudinal bump 300. Longitudinal bump 300 forms a terrain unevenness here, which may impede driving of vehicle 100 or may cause damage to vehicle 100 when vehicle 100 is being driven. The problem shown schematically in FIG. 3A is a frequent one and a consequence of road ways being worn out from driving and/or washed out. Vehicle 100 is driving in the existing driving ruts. The wedge or longitudinal bump 300 in the center may become so high that the ground clearance is no longer sufficient. An underbody 302 of vehicle 100 may become damaged and/or vehicle 100 may lose traction and become stuck. This situation may be encountered over an extended driving distance.

Figure 3B:
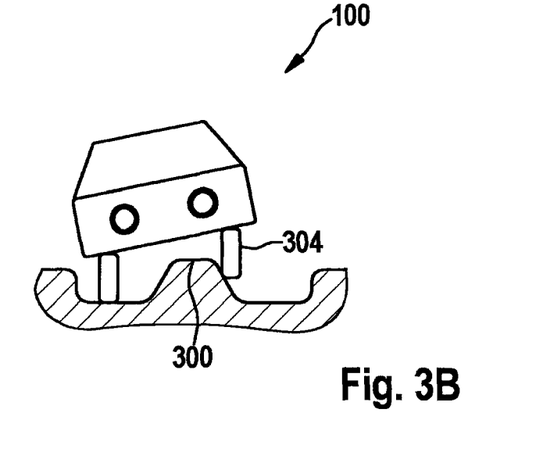

Based on a further sketch, FIG. 3B shows a driving behavior to solve the present problem by way of example. Here, the risk of vehicle 100 being damaged or becoming stuck is averted by vehicle 100 being driven on longitudinal bump 300 on one side—here with wheels 304 on the left side of vehicle 100. This may be achieved, for example, by a driver of vehicle 100 having received an appropriate piece of steering information, which was made accessible to him or her, for example, via a superimposition on the display unit of vehicle 100.

FIGS. 4A through 4C again schematically show vehicle 100 being driven on problematic ramps by way of example.

Figure 4A:
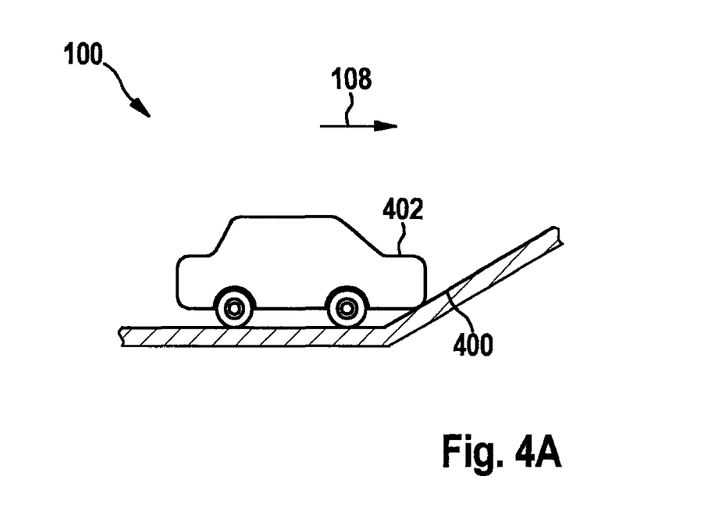
FIGS. 4A, 4B and 4C show schematic diagrams of a vehicle being driven on a ramp, according to exemplary embodiments of the present invention.

FIG. 4A shows vehicle 100 entering or driving onto a ramp 400. As the illustration of FIG. 4A shows, the risk of damaging a front 402 of vehicle 100 exists when ramp 400 has an accordingly steep configuration.

FIG. 4B again by way of example shows a possible risk for a rear 404 of vehicle 100 when negotiating a ramp 400.

Figure 4B:
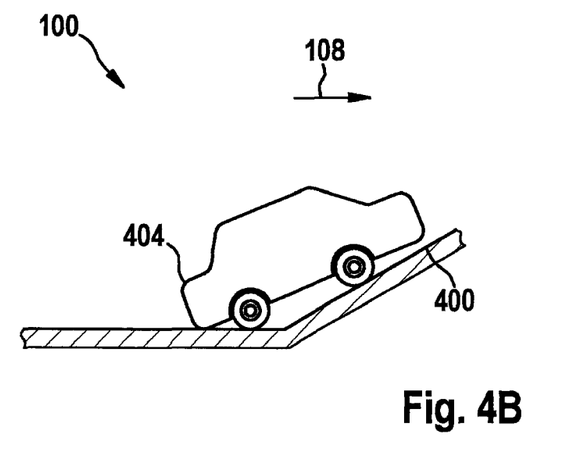
Figure 4C:
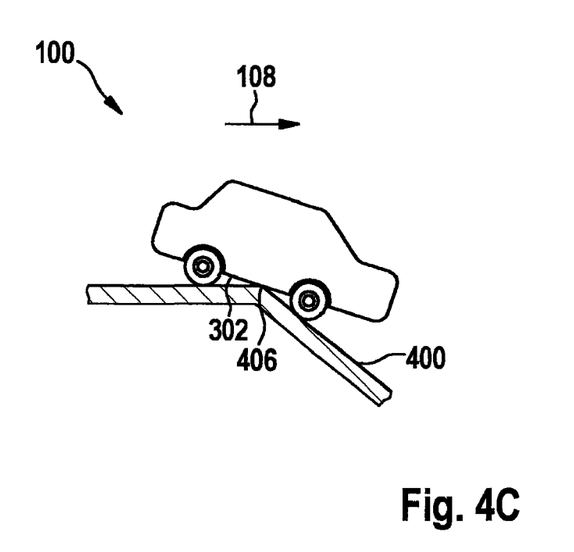

FIG. 4C shows that the risk of underbody 302 of vehicle 100 being damaged, or vehicle 100 losing traction and becoming stuck, exists when entering a descending ramp 400.

The exemplary situations shown in FIGS. 4A through 4C, which may arise when driving on uneven terrain, illustrate that there is the risk of vehicle front 402 or vehicle rear 404 being damaged by contact with the roadway when entering or exiting ramps 400. When the vehicle is driven at an appropriate speed and has a stable rear 404, a rear axle of vehicle 100 may optionally be so drastically relieved that vehicle 100 loses traction and becomes stuck. Moreover, a ground clearance may be small for a kink or a crown 406, and vehicle 100 may hit the ground. Vehicle 100 may be damaged here or also lose traction. Ramps 400 may become too steep to be driven at a particular length and grip of the surface. After vehicle 100 has lost its momentum, it would come to a halt, and roll back again or slide.

A situation analogous to the situations shown based on the illustrations of FIGS. 4A through 4C also results when a vehicle is driven on a bump or transverse bump extending transversely to driving direction 108. Such a transverse bump is not shown in the figures; however, negotiating or traversing such a bump in the broadest sense corresponds to the situation when entering or exiting—very short—ramps 400.

Figure 5A:
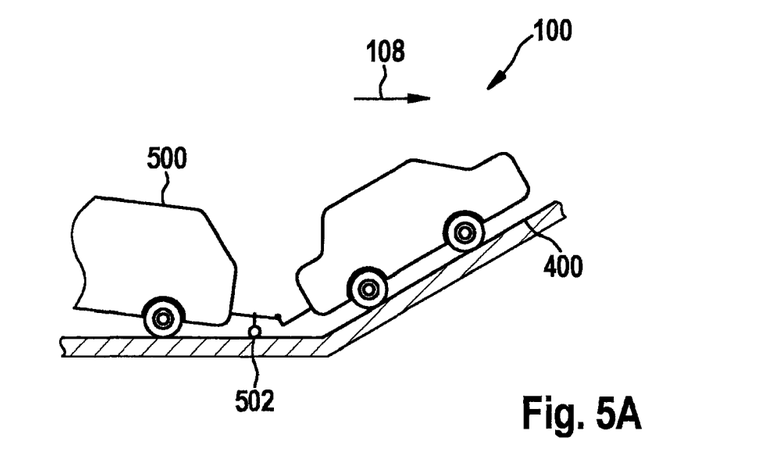
FIGS. 5A and 5B show schematic diagrams of a vehicle including a trailer being driven on a ramp, according to exemplary embodiments of the present invention.
Figure 5B:
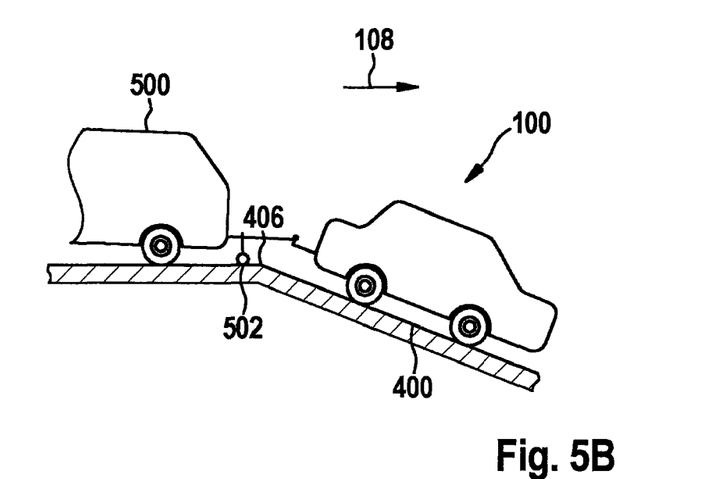

Based on further sketches, FIGS. 5A and 5B show examples of critical situations in conjunction with a trailer 500 attached to vehicle 100.

FIG. 5A shows a critical situation of a vehicle including a trailer 500 being driven on a ramp 400 by way of example. Trailer 500 is a camper here. However, trailer 500 may also be a cargo trailer, for example. The illustration in FIG. 5A shows that a trailer hitch 502 makes contact with the roadway when the vehicle is driven onto ramp 400. The risk exists of trailer hitch 502 breaking or becoming detached, and trailer 500 being decoupled from vehicle 100 and becoming damaged or putting other road users at risk.

FIG. 5B shows a problem of traversing a crown 406 or of entering a downwardly directed ramp 400 with attached trailer 500 by way of example. Once again, trailer hitch 502 may break or detach and inadvertently release trailer 500.

FIGS. 5A and 5B illustrate that trailer 500 must be appropriately considered in the method for assisting a driver of vehicle 100 when coupling a trailer 500 to vehicle 100. Corresponding adaptations of the algorithms of the method are derived for the identification.

Figure 6:
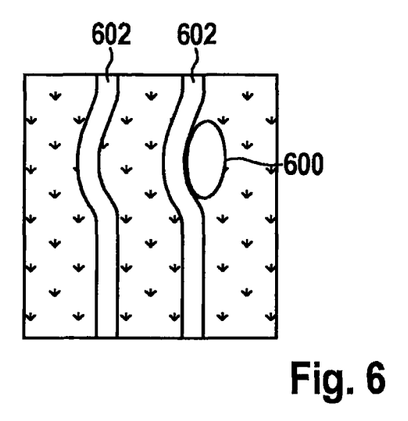
FIG. 6 shows a schematic diagram of a strategy of circumnavigating a terrain unevenness, according to one exemplary embodiment of the present invention.

FIG. 6 shows a top view onto a sketch of a strategy for circumnavigating a terrain unevenness, according to one exemplary embodiment of the present invention. The terrain unevenness is a pothole 600 here. An ideal trajectory 602 identified in the illustration with the aid of a traffic lane follows an appropriate piece of information for driving the vehicle—which is not shown here—to circumnavigate pothole 600. A criticality of a pothole 600 is dependent on its depth and length. Potholes 600 into which the wheels of the vehicle may enter too deeply must be identified as being critical. In addition to tires and the chassis, it is then also possible for the body to become damaged. Instead of pothole 600, the terrain unevenness shown in FIG. 6 may also represent another critical location or a critical object, for example a rock fragment.

Instead of or in addition to potholes 600, the ground to be driven on may also have deformations of the traffic lane. When the vehicle is driven on a traffic lane having deformations, one or multiple wheels of the vehicle may be relieved so much that they lose traction and the vehicle becomes stuck. While differential locks may redirect the traction to the loaded wheels and thus free the vehicle again, avoiding such situations is faster and therefore desirable.

Figure 7:
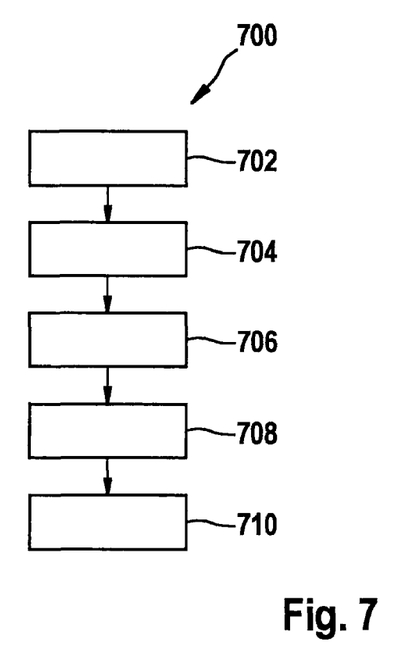
FIG. 7 shows a flow chart of a method for assisting a driver of a vehicle when driving on uneven terrain according to one exemplary embodiment of the present invention.

FIG. 7 shows one exemplary embodiment of a flow chart of a method 700 for assisting a driver of a vehicle when driving on uneven terrain. In a step 702, one or multiple sensors, for example front camera sensors, of the vehicle detect a terrain unevenness situated ahead of the vehicle in the driving direction. The terrain unevenness is classified in a step 704. For example, the terrain unevenness may be classified in the step of classifying 704 as a ramp, a transverse bump, a longitudinal bump, a pothole, or a traffic lane deformation. The terrain unevenness may also be classified as a combination of several or all of the described features. In a step 706, a result of the step of classifying 704 is used to ascertain a piece of information for driving the vehicle in relation to the terrain unevenness. This piece of information is output to the driver of the vehicle, or to a driver assistance system of the vehicle, for example, in a step 708. The piece of information for driving the vehicle may be output to the driver of the vehicle, e.g., as a warning or as a piece of information for carrying out a suitable steering movement. In the exemplary embodiment of method 700 described herein, method 700 furthermore includes a step 710 of reading in a piece of information about a trailer attached to the vehicle.

If in step 710 the piece of information that a trailer is attached to the vehicle is read in, the step of ascertaining 706 is furthermore carried out based on the piece of information about the trailer. Step 710 may be carried out at any arbitrary suitable point in time in method 700, or already before the start of method 700.

Method 700 for assisting a driver when driving off-road and on unpaved roads may be carried out in different functional variants.

In a first functional variant, the driver of the vehicle is given a warning by the output of a signal in step 708 based on the piece of information ascertained in step 706 after a critical situation was classified in step 704. The output of the warning in step 708 may take place in a simple form, or expanded by an exact reference to the critical situation, e.g., by markings on a head-up display which point to the direction in which the vehicle should be steered, or by a marking on the camera image, which is represented, e.g., on the head unit or main unit of an infotainment system of the vehicle.

In a second functional variant, the piece of information is ascertained in step 706 in such a way that it contains a recommendation for the driver on how he or she may circumnavigate the critical situation. The recommendation may be represented in step 708 on the combination instrument or head-up display as an icon, or also as an arrow marking, e.g., on the camera image. In the second functional variant, method 700 is used in situations as described in FIGS. 4A through 5B. Ramps 400 and transverse bumps are approached diagonally. The diagonal also mitigates excessively great uphill grades.

In a third functional variant, the piece of information is ascertained in step 706 as a piece of information for driving the vehicle on an ideal trajectory to avoid the critical situation by circumnavigation. In one specific embodiment of method 700, the piece of information includes an instruction regarding interventions in the steering system of the vehicle by a driver assistance system. The interventions may be subtle to merely give the driver slight hints, or also strong enough to automatically steer the vehicle. In this functional variant of method 700, additional pieces of information about surroundings of the vehicle are read in to avoid additional risks being taken by the circumnavigation. Method 700 is carried out accordingly in the third functional variant in order to circumnavigate deformations and potholes 600 in a situation as it is shown based on the illustration of FIG. 6. For this purpose, a track trail of a rear of the vehicle is considered in the calculation of the ideal trajectory 602. In this third functional variant, method 700 is also carried out when driving on a terrain having bumps in the longitudinal direction. As is illustrated based on FIGS. 3A and 3B, longitudinal bumps 300 are mitigated by one-sided driving on or along bump 300. Similarly to a lane keeping assistant system, vehicle 100 is guided along bump 300.

The method described herein and the described device are suitable in particular for a use in off-road vehicles, e.g., as a value-added function of a stereo video camera with positioning function (SOP).

The described exemplary embodiments shown in the figures are selected only by way of example. Different exemplary embodiments may be combined with each other completely or with respect to individual features. It is also possible to supplement one exemplary embodiment with features of another exemplary embodiment. Moreover, method steps according to the present invention may be carried out repeatedly and in a different order than the one described.

If one exemplary embodiment includes an "and/or" linkage between a first feature and a second feature, this should be read in such a way that the exemplary embodiment according to one specific embodiment includes both the first feature and the second feature, and according to an additional specific embodiment includes either only the first feature or only the second feature.

What is claimed is:

1. A method for assisting a driver of a vehicle when driving on uneven terrain, the method comprising:
   determining a 3D depiction of an environment ahead of the vehicle based on one or more images from at least one stereo front camera;
   classifying a terrain unevenness situated ahead of the vehicle in a driving direction as a longitudinal bump formed along the driving direction;
   based on a result of the classification, ascertaining a piece of information for carrying out a steering movement to initiate one-sided driving on the longitudinal bump by wheels on the left or right side of the vehicle;

determining an ideal trajectory for negotiating the terrain unevenness based on the ascertained piece of information; and communicating one or more instructions to the driver via a human-machine interface, the one or more instructions including one or more steering instructions for negotiating the terrain unevenness on the ideal trajectory.

2. The method of claim 1, further comprising:
detecting the terrain unevenness with the aid of at least one optical sensor of the vehicle.

3. The method of claim 1, wherein in the classifying, the terrain unevenness is classified as an obstacle which excludes damage-free onward travel of the vehicle, the piece of information for driving being ascertained in the ascertaining as a warning for the driver of the vehicle against onward travel.

4. The method of claim 1, wherein in the classifying, the terrain unevenness is classified as an obstacle which excludes damage-free onward travel of the vehicle, the piece of information for driving being ascertained in the ascertaining as a braking signal for initiating a brake application of the vehicle.

5. The method of claim 1, wherein in the classifying, the terrain unevenness is classified as a ramp and/or a transverse bump formed transversely to the driving direction, the piece of information for driving being ascertained in the ascertaining as a piece of information for carrying out a steering movement to initiate a negotiation of the ramp and/or the transverse bump in an onward driving direction which extends obliquely to the ramp and/or the transverse bump.

6. A device for assisting a driver of a vehicle when driving on uneven terrain, comprising:
a sensing unit to determine a 3D depiction of an environment ahead of the vehicle based on one or more images from at least one stereo front camera;
a classifying unit to classify a terrain unevenness situated ahead of the vehicle in a driving direction as a longitudinal bump formed along the driving direction;
an ascertaining unit to, based on a result of the classification, ascertain a piece of information for carrying out a steering movement to initiate one-sided driving on the longitudinal bump by wheels on the left or right side of the vehicle;
a determining unit to determine an ideal trajectory for negotiating the terrain unevenness based on the ascertained piece of information; and
a human-machine interface to communicate one or more instructions to the driver, the one or more instructions including one or more steering instructions for negotiating the terrain unevenness on the ideal trajectory.

7. The method of claim 1, further comprising:
reading in a piece of information about a trailer attached to the vehicle, wherein the ascertaining is further carried out based on the piece of information about the trailer.

8. The method of claim 1, further comprising:
outputting the piece of information for driving the vehicle to a driver assistance system of the vehicle, wherein the driver assistance system is configured to effectuate an intervention in a steering system of the vehicle and/or in a braking system of the vehicle, and/or the driver assistance system being configured to provide the driver of the vehicle with a hint about a driving style which is adapted to the terrain unevenness.

9. The device of claim 6, wherein the classifying unit is further configured to classify a terrain unevenness as at least one of a traffic lane deformation and a pothole, and the ascertaining unit is further configured to, based on a result of the classification as the at least one of the traffic lane deformation and the pothole, ascertain a piece of information for carrying out a steering movement for circumnavigating the at least one of the traffic lane deformation and the pothole on an ideal circumnavigating trajectory.

10. A computer readable medium having a computer program, which is executable by a processor, comprising:
a program code arrangement having program code for assisting a driver of a vehicle when driving on uneven terrain, by performing the following:
determining a 3D depiction of an environment ahead of the vehicle based on one or more images from at least one stereo front camera;
classifying a terrain unevenness situated ahead of the vehicle in a driving direction as a longitudinal bump formed along the driving direction;
based on a result of the classification, ascertaining a piece of information for carrying out a steering movement to initiate one-sided driving on the longitudinal bump by wheels on the left or right side of the vehicle;
determining an ideal trajectory for negotiating the terrain unevenness based on the ascertained piece of information; and
communicating one or more instructions to the driver via a human-machine interface, the one or more instructions including one or more steering instructions for negotiating the terrain unevenness on the ideal trajectory.

11. The method of claim 1, wherein the human-machine interface is a heads-up display.

12. The method of claim 11, wherein the one or more instructions include one or more arrow markings superimposed on the heads-up display.

* * * * *